US012333995B2

(12) United States Patent
Nho et al.

(10) Patent No.: US 12,333,995 B2
(45) Date of Patent: Jun. 17, 2025

(54) FEEDFORWARD COMPENSATION OF HIGH-LUMINANCE BANDING MURA COMPENSATION

(71) Applicant: Apple Inc., Cupertino, CA (US)

(72) Inventors: Hyunwoo Nho, Palo Alto, CA (US); Jie Won Ryu, San Jose, CA (US); Patrick R Cruce, Campbell, CA (US); Yao Shi, Sunnyvale, CA (US); Nicolas Le Dortz, Palo Alto, CA (US); Wei Xiong, Mountain View, CA (US); Hyunsoo Kim, San Diego, CA (US); Wei H Yao, Saratoga, CA (US); Sun-Il Chang, San Jose, CA (US); Kingsuk Brahma, Mountain View, CA (US); Ionut A Mirel, Cupertino, CA (US); Mahesh B Chappalli, San Jose, CA (US); Ruicong Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/596,520

(22) Filed: Mar. 5, 2024

(65) Prior Publication Data

US 2024/0331611 A1 Oct. 3, 2024

Related U.S. Application Data

(60) Provisional application No. 63/456,445, filed on Mar. 31, 2023.

(51) Int. Cl.
*G09G 3/32* (2016.01)
*G09G 3/20* (2006.01)

(52) U.S. Cl.
CPC ......... *G09G 3/2096* (2013.01); *G09G 3/2007* (2013.01); *G09G 3/32* (2013.01);
(Continued)

(58) Field of Classification Search
CPC .. G09G 3/3225; G09G 3/3233; G09G 3/3258; G09G 2320/0233
See application file for complete search history.

(56) References Cited

U.S. PATENT DOCUMENTS 11,295,674 B2 4/2022 Yang et al.
11,302,264 B2 4/2022 Gao
(Continued)

FOREIGN PATENT DOCUMENTS

CN 110880295 A 3/2020
CN 111028784 A 4/2020
(Continued)

*Primary Examiner* — Kevin M Nguyen
(74) *Attorney, Agent, or Firm* — Fletcher Yoder, P.C.

(57) ABSTRACT

Embodiments herein provide various apparatuses and techniques to efficiently mitigate front-of-screen (FoS) artifacts that may occur due to voltage fluctuations due to alternating current (AC) or direct current (DC) mechanisms that may occur in a variety of pixel types. In one embodiment, emission profile awareness circuitry may be implemented to mitigate for FoS artifacts due to DC mechanisms. Two-dimensional (2D) digital compensation circuitry may address the DC portion of the voltage fluctuations by accounting for an emission profile applied to content displayed on an electronic display. In some embodiments, the 2D digital compensation circuitry may compensate for the AC portion of the voltage fluctuations by duplicating the AC voltage fluctuations via voltage error subtraction circuitry and voltage error accumulation circuitry.

20 Claims, 14 Drawing Sheets

(52) U.S. Cl.
CPC ............... *G09G 2300/0842* (2013.01); *G09G 2320/0223* (2013.01); *G09G 2320/0233* (2013.01); *G09G 2320/0266* (2013.01); *G09G 2330/021* (2013.01); *G09G 2360/16* (2013.01)

(56) References Cited

U.S. PATENT DOCUMENTS

| | | | | |
|---|---|---|---|---|
| 11,495,177 | B2 | 11/2022 | Lin | |
| 11,676,556 | B2 | 6/2023 | Calayir et al. | |
| 2016/0260381 | A1 | 9/2016 | Gai | |
| 2019/0340980 | A1* | 11/2019 | Yum | G09G 3/3225 |
| 2023/0089942 | A1 | 3/2023 | Shi | |

FOREIGN PATENT DOCUMENTS

| | | | |
|---|---|---|---|
| CN | 117012152 | A | 11/2023 |
| JP | 2008164850 | A | 7/2008 |

* cited by examiner

FEEDFORWARD COMPENSATION OF HIGH-LUMINANCE BANDING MURA COMPENSATION

CROSS-REFERENCE TO RELATED APPLICATIONS

This application claims priority to U.S. Provisional Application No. 63/456,445, filed Mar. 31, 2023, entitled "Feedforward Compensation of High-Luminance Banding Mura Compensation," the disclosure of which is incorporated by reference herein in its entirety for all purposes.

SUMMARY

This disclosure relates to systems and methods for content-adaptive compensation for two-dimensional voltage error in an electronic display.

A summary of certain embodiments disclosed herein is set forth below. It should be understood that these aspects are presented to provide the reader with a brief summary of these certain embodiments and that these aspects are not intended to limit the scope of this disclosure.

Electronic displays may be found in numerous electronic devices, from mobile phones to computers, televisions, automobile dashboards, and augmented reality or virtual reality glasses, to name just a few. Electronic displays with self-emissive display pixels produce their own light. Self-emissive display pixels may include any suitable light-emissive elements, including light-emitting diodes (LEDs) such as organic light-emitting diodes (OLEDs) or micro-light-emitting diodes (μLEDs). By causing different display pixels to emit different amounts of light, individual display pixels of an electronic display may collectively produce images.

The self-emissive display pixels of the electronic display consume electrical energy to emit the light, which is supplied by a power supply. As the power supply delivers voltage to a column of pixels, however, the voltage supplied may drop as the voltage is delivered to pixels further away from the power supply due to internal resistance of the conductive wires and/or the LEDs themselves. For this reason, the voltage error or voltage drop is also often referred to as IR error or IR drop, corresponding to the principle that voltage (V) is equal to current (I) multiplied by resistance (R) in a circuit. The voltage error may cause the pixels to output a different luminance (and, by extension, a different color) than intended. This could negatively impact the picture quality of the electronic display.

To account for non-linear voltage error, a content-adaptive two-dimensional IR drop adjustment (2D digital compensation) pixel compensation scheme may be employed. However, in some cases, a constant IR drop may manifest as different degrees and/or types of FoS artifacts depending on characteristics of the electronic display. The particular FOS artifact manifested may depend on the type of pixel used in the electronic display. For example, a low-temperature polycrystalline oxide (LTPO) pixel may be sensitive to supply voltage (e.g., ELVDD voltage, ELVSS voltage) because one side of a storage capacitor of the LTPO pixel stores data, while the other side of the storage capacitor stores ELVDD voltage. Consequently, the data programming of the LTPO pixel may be influenced by or referenced to ELVDD. Other varieties of pixels (e.g., pixels that are not referenced to ELVDD) may have higher or lower ELVDD sensitivity than an LTPO pixel display. Further, ELVDD sensitivity fluctuations may occur due to alternating current (AC) or direct current (DC) mechanisms. While the figures and discussion below may focus on ELVDD and ELVSS, it should be noted that the systems and methods discussed may apply to any suitable power supply or any suitable power rails used for pixel driving, such as initiation voltage (Vinit), reference voltage (Vref), reset voltage (Vreset), and so on.

Embodiments herein provide various apparatuses and techniques to efficiently mitigate FoS artifacts that may occur due to AC or DC mechanisms that may occur in a variety of pixel types. In one embodiment, emission profile awareness circuitry may be implemented to mitigate for FoS artifacts due to DC mechanisms. By accounting for the rolling emission mask prior to calculating per-zone average pixel luminance (APL) calculations, a 2D digital compensation may determine voltage error (e.g., IR drop, IR rise) across an electronic display more accurately. In other embodiments, an accumulator compensation may be implemented to determine multiple voltage error differentials between multiple rows of pixels on the electronic display. The multiple voltage error differentials may be weighted based on time, and the weighted differentials may be accumulated to mirror the AC components of the voltage fluctuations. The 2D digital compensation may apply a compensation based on the accumulator compensation to mitigate the AC components of the voltage fluctuations, thus reducing or eliminating the FoS artifacts.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
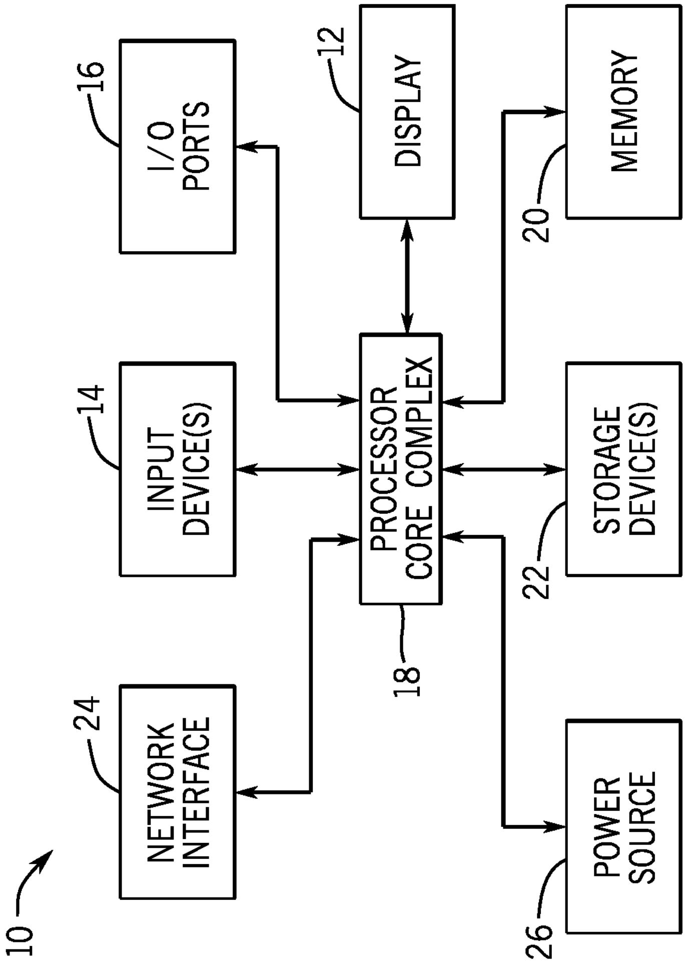
FIG. 1 is a block diagram of an electronic device having an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles “a,” “an,” and “the” are intended to mean that there are one or more of the elements. The terms “including” and “having” are intended to be inclusive and mean that there may be additional elements other than the listed elements. Additionally, it should be understood that references to “some embodiments,” “embodiments,” “one embodiment,” or “an embodiment” of the present disclosure are not intended to be interpreted as excluding the existence of additional embodiments that also incorporate the recited features. Furthermore, the phrase A “based on” B is intended to mean that A is at least partially based on B. Moreover, the term “or” is intended to be inclusive (e.g., logical OR) and not exclusive (e.g., logical XOR). In other words, the phrase A “or” B is intended to mean A, B, or both A and B.

To account for non-linear voltage error, a content-adaptive two-dimensional current-resistance voltage (IR) drop adjustment (e.g., 2D digital compensation) pixel compensation scheme may be employed. However, in some cases, a constant IR drop may manifest as different degrees and/or types of front-of-screen (FoS) image artifacts depending on characteristics of the electronic display. The particular FOS artifact manifested may depend on the type of pixel used in the electronic display. For example, a low-temperature polycrystalline oxide (LTPO) pixel may be sensitive to supply voltages (e.g., ELVDD, ELVSS) because one side of a storage capacitor of the LTPO pixel stores data, while the other side of the storage capacitor stores ELVDD voltage. Consequently, the data programming of the LTPO pixel may be influenced by or referenced to ELVDD. Other varieties of pixels (e.g., pixels that are not referenced to ELVDD) may have higher or lower ELVDD sensitivity than an LTPO pixel display. Further, ELVDD sensitivity fluctuations may occur due to alternating current (AC) or direct current (DC) mechanisms.

Embodiments herein provide various apparatuses and techniques to efficiently mitigate FoS artifacts that may occur due to AC or DC mechanisms that may occur in a variety of display pixel types. In one embodiment, emission profile awareness circuitry may be implemented to mitigate for FoS artifacts due to DC mechanisms. By accounting for the rolling emission mask prior to calculating per-zone average pixel luminance (APL) calculations, a 2D digital compensation may determine voltage error (e.g., IR drop, IR rise) across an electronic display more accurately. In other embodiments, an accumulator compensation may be implemented to determine multiple voltage error differentials between multiple rows of pixels on the electronic display. The multiple voltage error differentials may be weighted based on time, and the weighted differentials may be accumulated to mirror the AC components of the voltage fluctuations. The 2D digital compensation may apply a compensation based on the accumulator compensation to mitigate the AC components of the voltage fluctuations, thus reducing or eliminating the FoS artifacts. While the figures and discussion below may focus on ELVDD and ELVSS, it should be noted that the systems and methods discussed may apply to any suitable power supply or any suitable power rails used for pixel driving, such as Vinit, Vref, and so on.

With this in mind, an example of an electronic device 10, which includes an electronic display 12 that may benefit from these features, is shown in FIG. 1. FIG. 1 is a schematic block diagram of the electronic device 10. The electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a wearable device, a watch, a vehicle dashboard, and/or the like. Thus, it should be noted that FIG. 1 is merely one example of a particular implementation and is intended to illustrate the types of components that may be present in an electronic device 10.

In addition to the electronic display 12, as depicted, the electronic device 10 includes one or more input devices 14, one or more input/output (I/O) ports 16, a processor core complex 18 having one or more processors or processor cores and/or image processing circuitry, memory 20, one or more storage devices 22, a network interface 24, and a power supply 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and the storage devices 22 may be included in a single component. Additionally or alternatively, image processing circuitry of the processor core complex 18 may be disposed as a separate module or may be disposed within the electronic display 12.

The processor core complex 18 is operably coupled with the memory 20 and the storage device 22. As such, the processor core complex 18 may execute instructions stored in memory 20 and/or a storage device 22 to perform operations, such as generating or processing image data. The processor core complex 18 may include one or more microprocessors, one or more application specific processors (ASICs), one or more field programmable logic arrays (FPGAs), or any combination thereof.

In addition to instructions, the memory 20 and/or the storage device 22 may store data, such as image data. Thus, the memory 20 and/or the storage device 22 may include one or more tangible, non-transitory, computer-readable media that store instructions executable by processing circuitry, such as the processor core complex 18, and/or data to be processed by the processing circuitry. For example, the memory 20 may include random access memory (RAM) and the storage device 22 may include read only memory (ROM), rewritable non-volatile memory, such as flash memory, hard drives, optical discs, and/or the like.

The network interface 24 may enable the electronic device 10 to communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a fourth-generation wireless network (4G), LTE, or fifth-generation wireless network (5G), or the like. In other words, the network interface 24 may enable the electronic device 10 to transmit data (e.g., image data) to a communication network and/or receive data from the communication network.

The power supply 26 may provide electrical power to operate the processor core complex 18 and/or other components in the electronic device 10, for example, via one or more power supply rails. Thus, the power supply 26 may include any suitable source of electrical power, such as a rechargeable lithium polymer (Li-poly) battery and/or an alternating current (AC) power converter. A power management integrated circuit (PMIC) may control the provision and generation of electrical power to the various components of the electronic device 10.

The I/O ports 16 may enable the electronic device 10 to interface with another electronic device 10. For example, a portable storage device may be connected to an I/O port 16, thereby enabling the electronic device 10 to communicate data, such as image data, with the portable storage device.

The input devices 14 may enable a user to interact with the electronic device 10. For example, the input devices 14 may include one or more buttons, one or more keyboards, one or more mice, one or more trackpads, and/or the like. Additionally, the input devices 14 may include touch sensing components implemented in the electronic display 12, as described further herein. The touch sensing components may receive user inputs by detecting occurrence and/or position of an object contacting the display surface of the electronic display 12.

In addition to enabling user inputs, the electronic display 12 may provide visual representations of information by displaying one or more images (e.g., image frames or pictures). For example, the electronic display 12 may display a graphical user interface (GUI) of an operating system, an application interface, text, a still image, or video content. To facilitate displaying images, the electronic display 12 may include a display panel with one or more display pixels. The display pixels may represent sub-pixels that each control a luminance of one color component (e.g., red, green, or blue for a red-green-blue (RGB) pixel arrangement).

The electronic display 12 may display an image by controlling the luminance of its display pixels based at least in part image data associated with corresponding image pixels in image data. In some embodiments, the image data may be generated by an image source, such as the processor core complex 18, a graphics processing unit (GPU), an image sensor, and/or memory 20 or storage devices 22. Additionally, in some embodiments, image data may be received from another electronic device 10, for example, via the network interface 24 and/or an I/O port 16.

Figure 2:
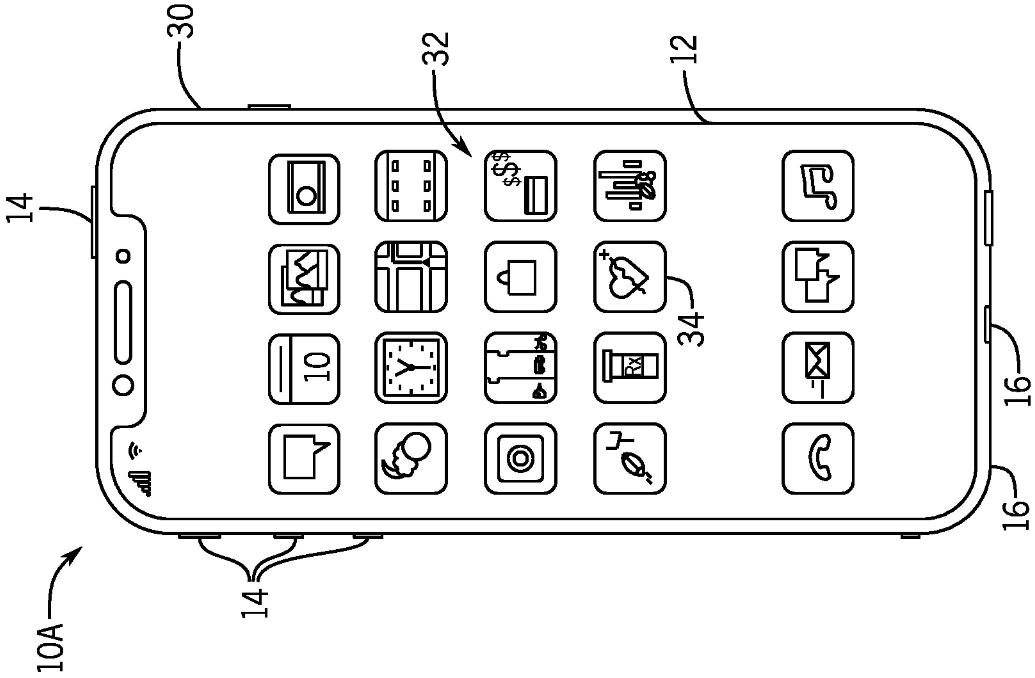
FIG. 2 is an example of the electronic device in the form of a handheld device, in accordance with an embodiment.

One example of the electronic device 10, specifically a handheld device 10A, is shown in FIG. 2. FIG. 2 is a front view of the handheld device 10A representing an example of the electronic device 10. The handheld device 10A may be a portable phone, a media player, a personal data organizer, a handheld game platform, and/or the like. For example, the handheld device 10A may be a smart phone, such as any iPhone® model available from Apple Inc.

The handheld device 10A includes an enclosure 30 (e.g., housing). The enclosure 30 may protect interior components from physical damage and/or shield them from electromagnetic interference. In the depicted embodiment, the electronic display 12 is displaying a graphical user interface (GUI) 32 having an array of icons 34. By way of example, when an icon 34 is selected either by an input device 14 or a touch sensing component of the electronic display 12, an application program may launch.

Input devices 14 may be provided through the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. The I/O ports 16 also open through the enclosure 30. The I/O ports 16 may include, for example, a Lightning® or Universal Serial Bus (USB) port.

Figure 3:
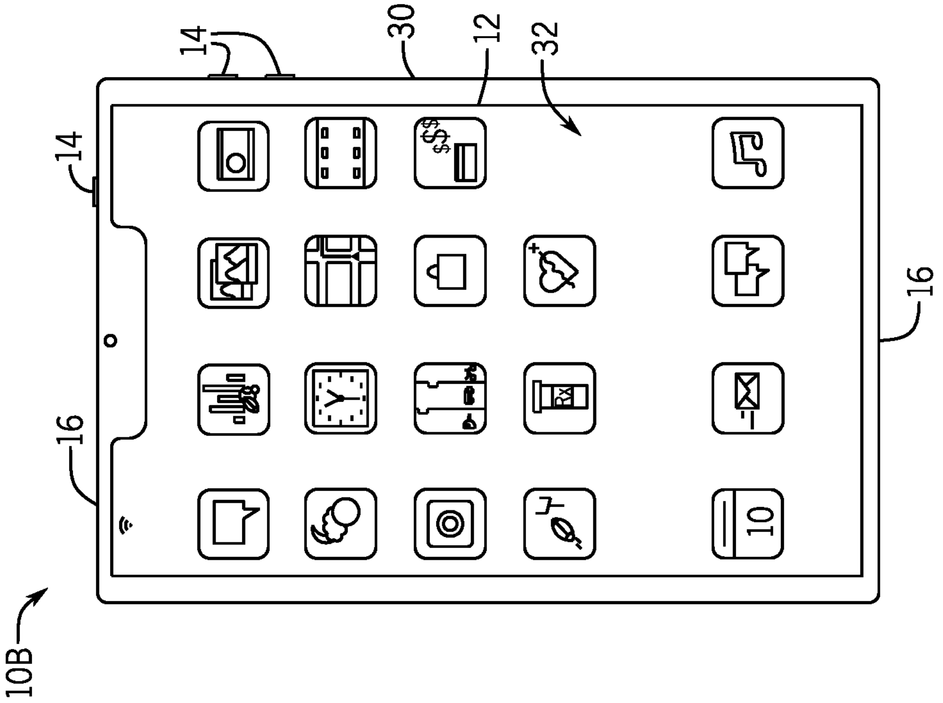
FIG. 3 is an example of the electronic device in the form of a tablet device, in accordance with an embodiment.
Figure 4:
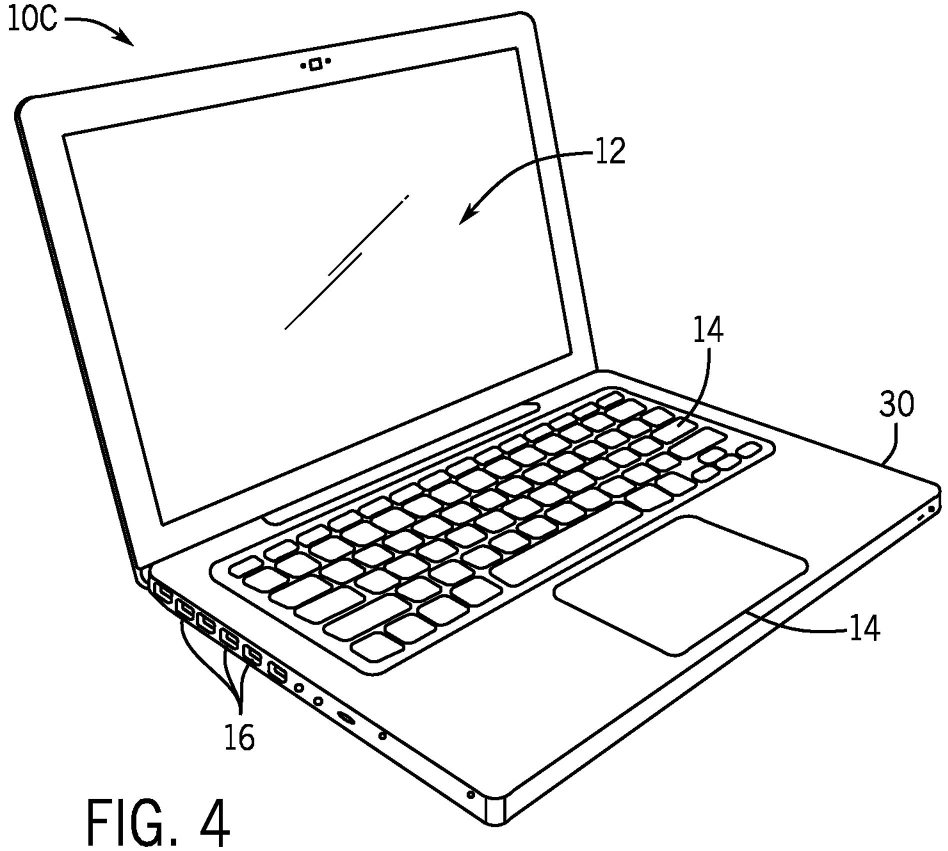
FIG. 4 is an example of the electronic device in the form of a notebook computer, in accordance with an embodiment.
Figure 5:
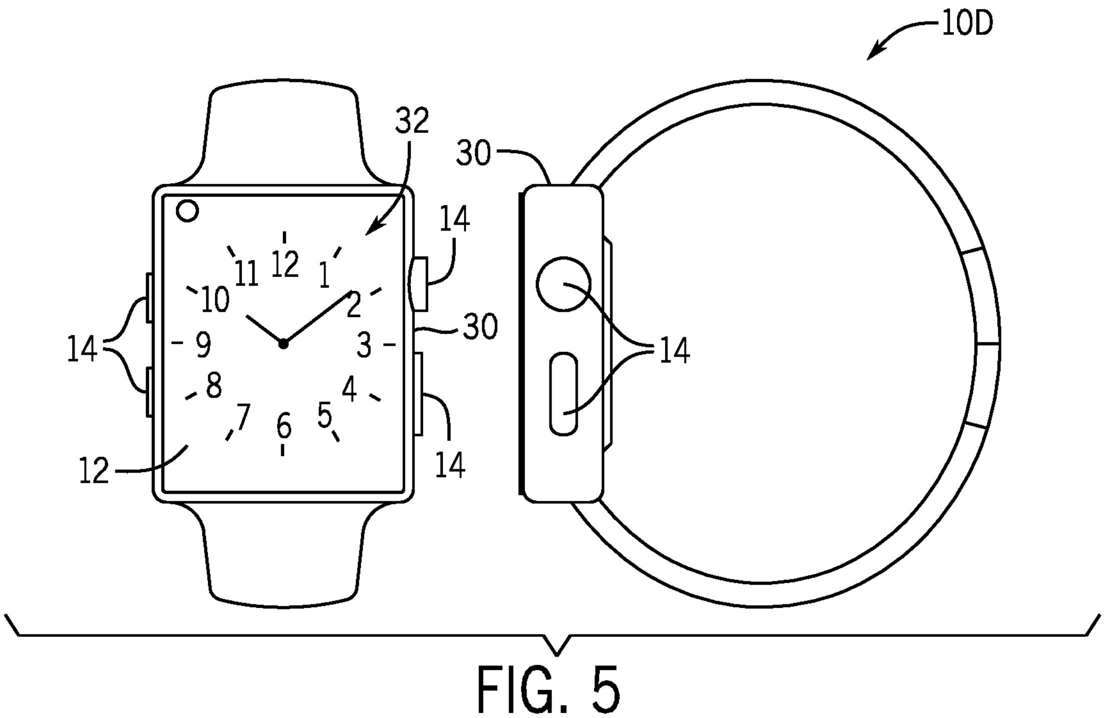
FIG. 5 is an example of the electronic device in the form of a wearable device, in accordance with an embodiment.

The electronic device 10 may take the form of a tablet device 10B, as shown in FIG. 3. FIG. 3 is a front view of the tablet device 10B representing an example of the electronic device 10. By way of example, the tablet device 10B may be any iPad® model available from Apple Inc. A further example of a suitable electronic device 10, specifically a computer 10C, is shown in FIG. 4. FIG. 4 is a front view of the computer 10C representing an example of the electronic device 10. By way of example, the computer 10C may be any MacBook® or iMac® model available from Apple Inc. Another example of a suitable electronic device 10, specifically a watch 10D, is shown in FIG. 5. FIG. 5 are front and side views of the watch 10D representing an example of the electronic device. By way of example, the watch 10D may be any Apple Watch® model available from Apple Inc. As depicted, the tablet device 10B, the computer 10C, and the watch 10D all include respective electronic displays 12, input devices 14, I/O ports 16, and enclosures 30.

Figure 6:
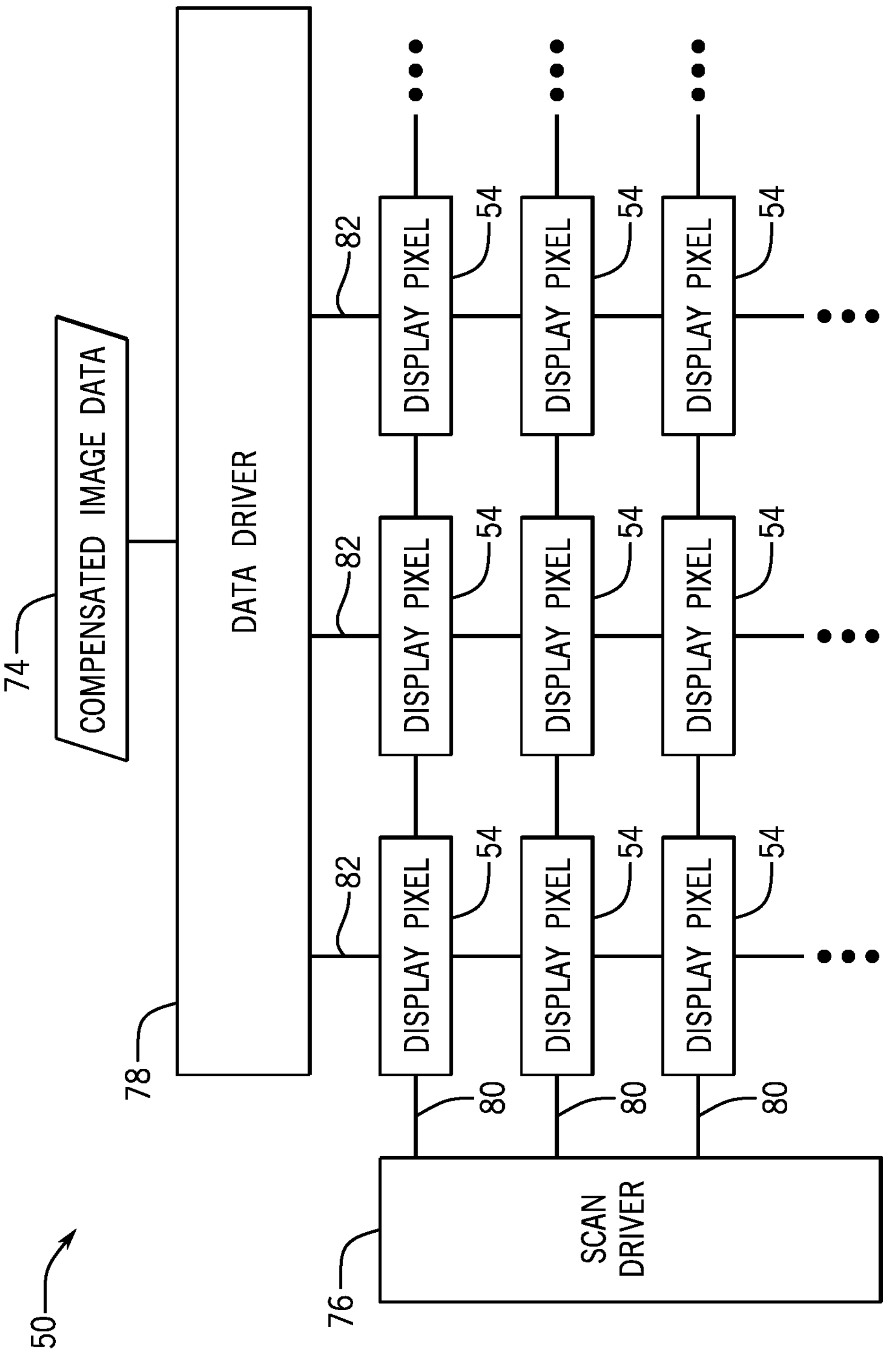
FIG. 6 is a block diagram of the electronic display, in accordance with an embodiment.

Describing now the display pixel array 50, FIG. 6 is a block diagram of the display pixel array 50 of the electronic display 12. It should be understood that, in an actual implementation, additional or fewer components may be included in the display pixel array 50.

The electronic display 12 may receive compensated image data 74 for presentation on the electronic display 12. The electronic display 12 includes display driver circuitry that includes scan driver circuitry 76 and data driver circuitry 78. The display driver circuitry controls programing the compensated image data 74 into the display pixels 54 for presentation of an image frame via light emitted according to each respective bit of compensated image data 74 programmed into one or more of the display pixels 54.

The display pixels 54 may each include one or more self-emissive elements, such as a light-emitting diodes (LEDs) (e.g., organic light emitting diodes (OLEDs) or micro-LEDs (μLEDs)), however other pixels may be used with the systems and methods described herein including but not limited to liquid-crystal devices (LCDs), digital mirror devices (DMD), or the like, and include use of displays that use different driving methods than those described herein, including partial image frame presentation modes, variable refresh rate modes, or the like.

Different display pixels 54 may emit different colors. For example, some of the display pixels 54 may emit red light, some may emit green light, and some may emit blue light. Thus, the display pixels 54 may be driven to emit light at different brightness levels to cause a user viewing the electronic display 12 to perceive an image formed from different colors of light. The display pixels 54 may also correspond to hue and/or luminance levels of a color to be emitted and/or to alternative color combinations, such as combinations that use red (R), green (G), blue (B), or others.

The scan driver circuitry 76 may provide scan signals (e.g., pixel reset, data enable, on-bias stress) on scan lines 80 to control the display pixels 54 by row. For example, the scan driver circuitry 76 may cause a row of the display pixels 54 to become enabled to receive a portion of the compensated image data 74 from data lines 82 from the data driver circuitry 78. In this way, an image frame of the compensated image data 74 may be programmed onto the display pixels 54 row by row. Other examples of the electronic display 12 may program the display pixels 54 in groups other than by row.

Figure 7:
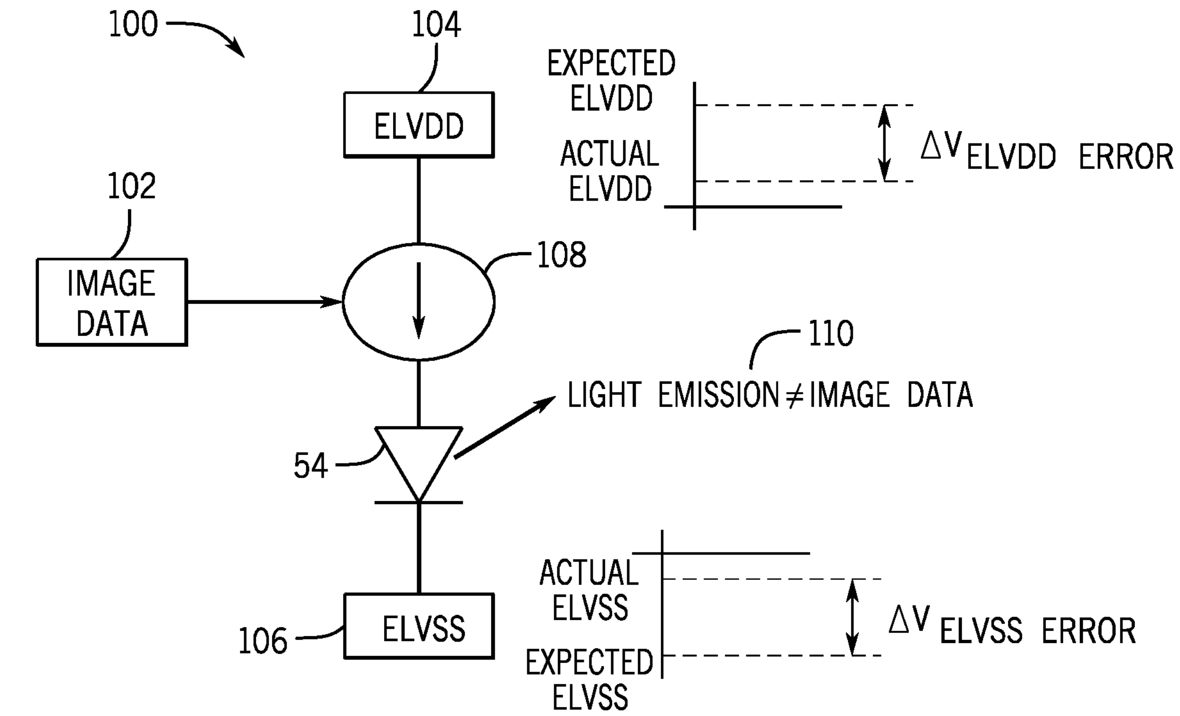
FIG. 7 is a circuit diagram of a display pixel impacted by IR drop across the electronic display, in accordance with an embodiment.
Figure 8:
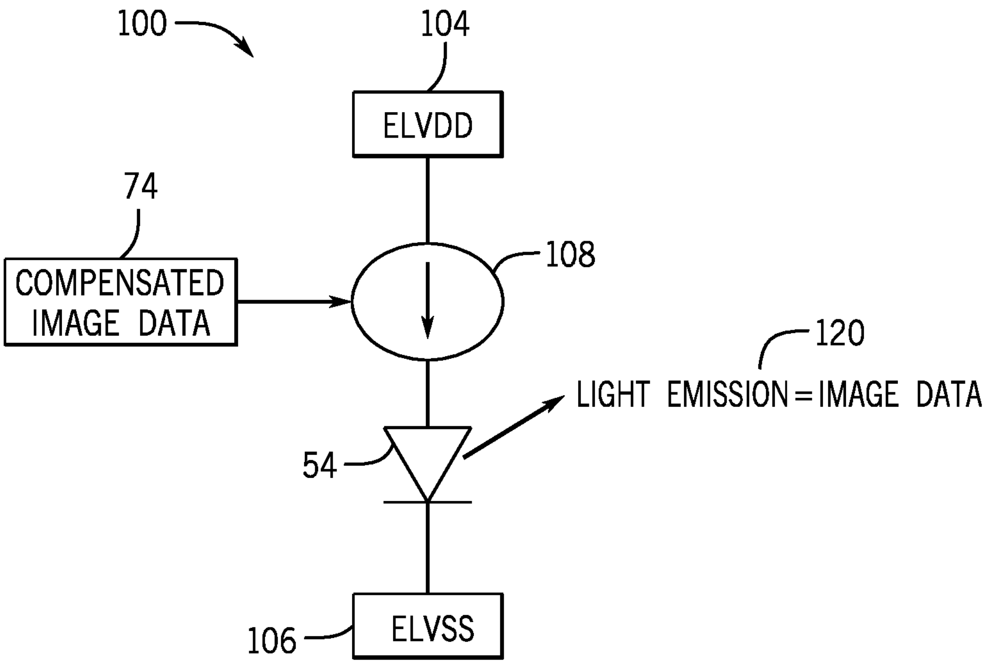
FIG. 8 is the circuit diagram of FIG. 7 after applying compensated image data, in accordance with an embodiment.

FIG. 7 is a simplified schematic diagram of pixel circuitry 100 of the display pixel 54. The pixel circuitry 100 may include a supply voltage ELVDD 104 and a second supply voltage ELVSS 106 that drive current 108 to the display pixel 54 based on image data 102. As may be seen from the light emission 110, prior to image data compensation, the light emission 110 is not the same as the image data 102 due to the voltage error discussed above. FIG. 8 illustrates the pixel circuitry 100 after the image data 102 has been compensated to generate compensated image data 74. The compensated image data 74 causes the light emission 120 of the display pixel 54 to be the same as the image data 102.

Figure 9:
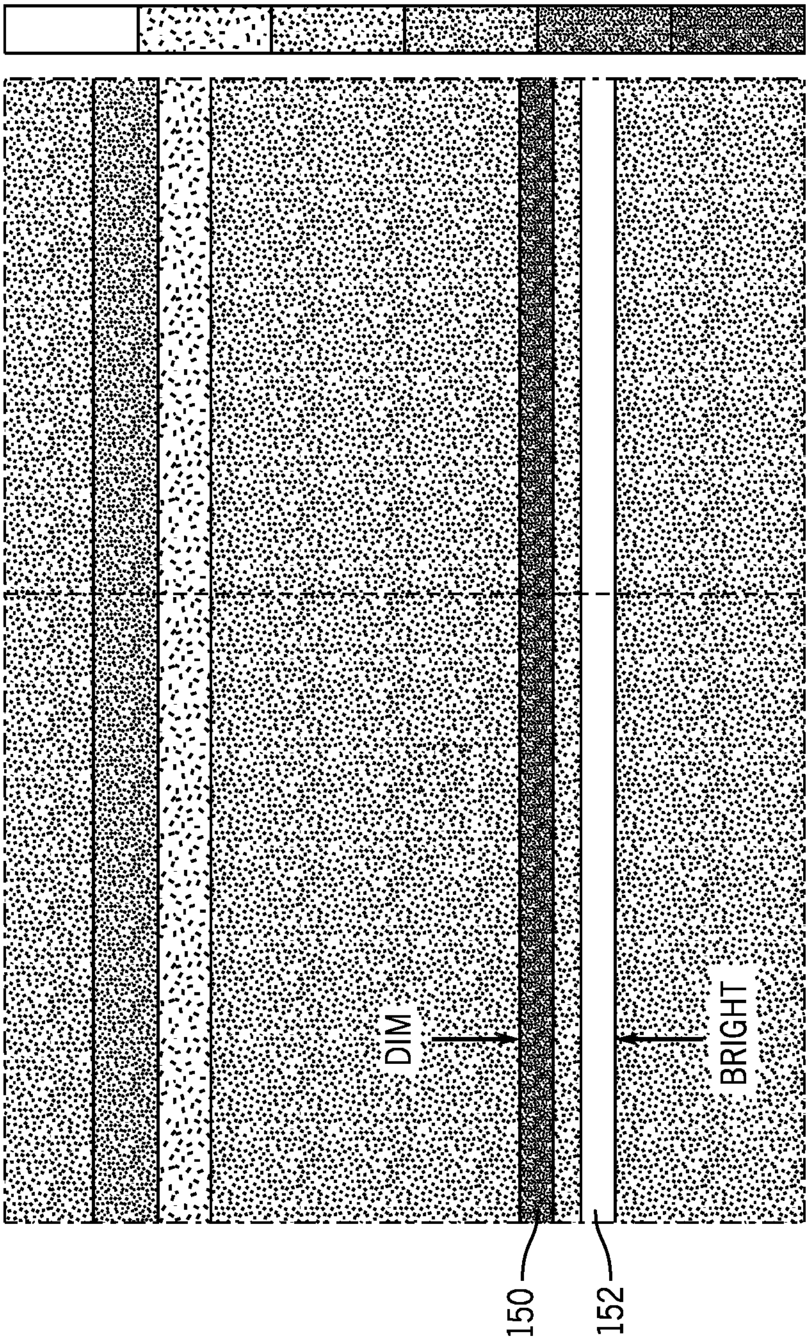
FIG. 9 is an illustration of front-of-screen image artifacts that may manifest on the electronic display of the electronic device of FIG. 1 due to voltage error.

FIG. 9 is an illustration of FoS artifacts that may manifest on the electronic display 12 due to voltage error. For electronic displays 12 utilizing certain types of pixels (e.g., LTPO pixels, full-oxide pixels), for low luminance backgrounds, there may be a white horizontal bar of content (e.g., an aggressor) that may cause voltage fluctuations (e.g., IR drop, IR rise) across the electronic display 12. The voltage fluctuations may cause a dim band artifact 150 and a bright band artifact 152 to appear on the low luminance background. Such FoS artifacts may negatively impact viewing experience.

Figure 10:
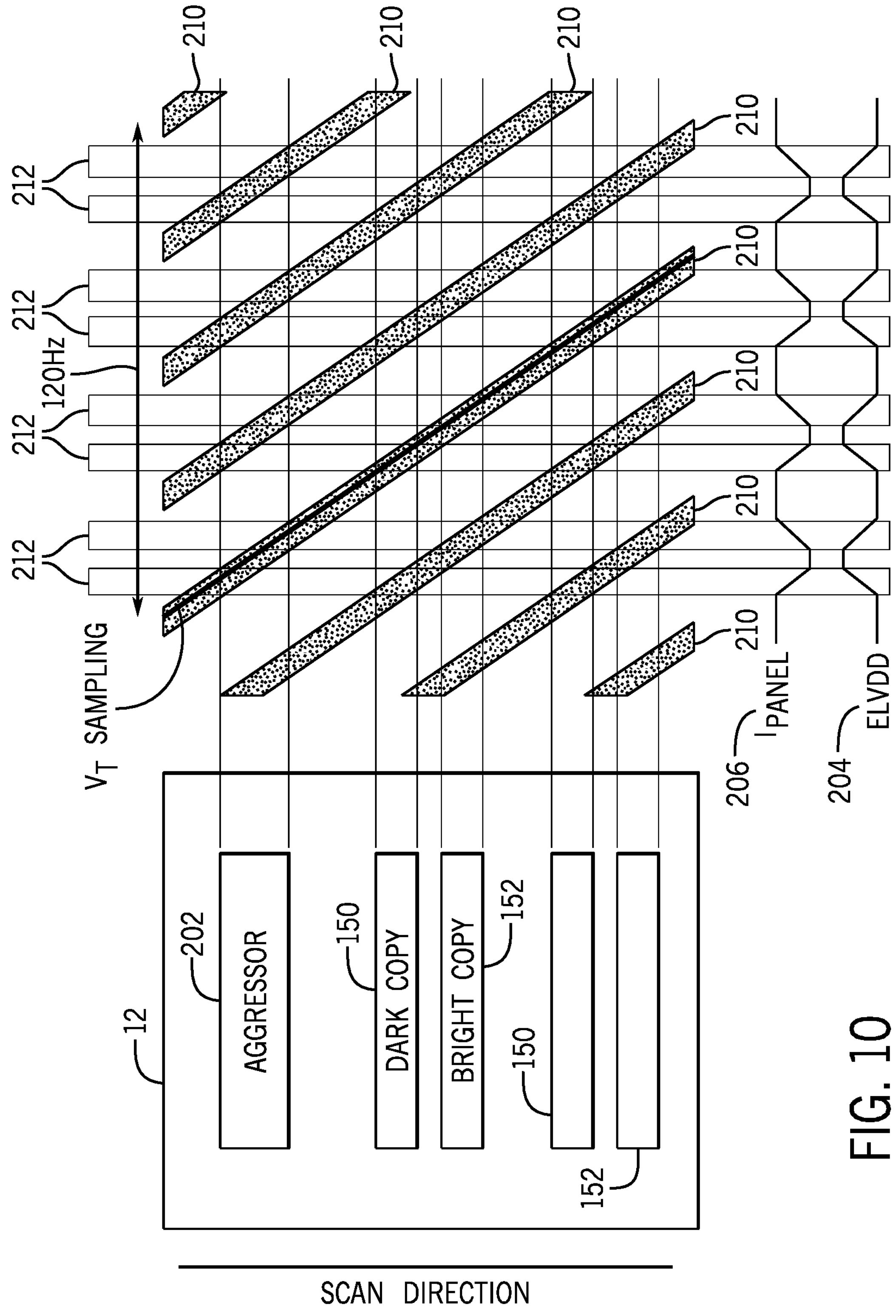
FIG. 10 is an illustration of operation of the electronic display experiencing the image artifacts of FIG. 9.

FIG. 10 is an illustration of operation of the electronic display 12 experiencing the FoS artifacts discussed with respect to FIG. 9 above. The electronic display 12 may or shall display aggressor content 202 (e.g., a bright white horizontal band across the electronic display 12). The aggressor content 202 may cause voltage fluctuations of supply voltage ELVDD 204 and panel current 206, causing the electronic display 12 to exhibit the dim band artifacts 150 and the bright band artifacts 152. As may be observed, the ELVDD 204 and the panel current 206 may fluctuate with time. The voltage fluctuations of the ELVDD 204 may be caused or exacerbated by the aggressor content 202 overlapping with an emission mask (EM) 210. The EM off periods may correspond to the ELVDD 204 rise and the EM on periods may correspond to ELVDD 204 fall. Some display pixels 54 in the pixels columns 212 may contribute to voltage error (e.g., IR drop, IR rise) across the electronic display 12 due to the aggressor content 202. The display pixels 54 covered by the emission mask 210 may not be illuminated, and thus do not contribute to the voltage error. Thus, to accurately determine the voltage error, the emission mask 210 may be determined and accounted for.

Figure 11:
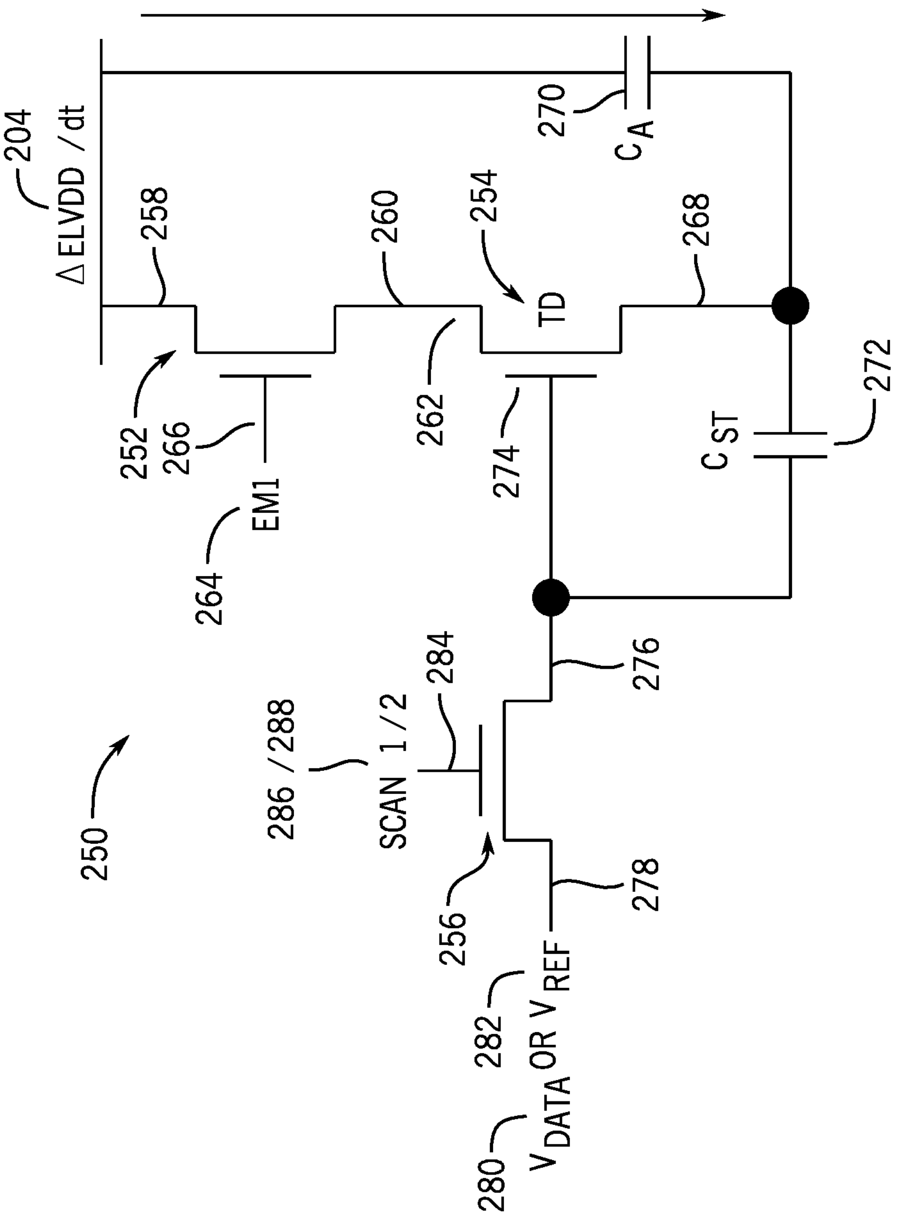
FIG. 11 is a schematic diagram of a pixel circuit that may experience negatively impacted performance based on fluctuations of the supply voltage.

FIG. 11 is a schematic diagram of a pixel circuit 250 that may experience negatively impacted performance based on fluctuations of the ELVDD 204. The pixel circuit 250 includes transistors 252, 254, and 256. The transistor 252 is coupled at a drain terminal 258 to the ELVDD 204 and coupled at a source terminal 260 to a drain terminal 262 of the transistor 254. The transistor 252 is may receive emission mask data 264 at a gate terminal 266. A source terminal of the transistor 254 is coupled between a capacitor 270 and a capacitor 272. A gate terminal 274 of the transistor 254 is coupled to a source terminal 276 of the transistor 256. A drain terminal 278 of the transistor 256 is may receive a data voltage 280 or reference voltage 282. A gate terminal 284 of the transistor 256 is coupled to a first scan line 286 or a second scan line 288. The ELVDD 204 fluctuation due to the aggressor content 202 may cause the ELVDD 204 to exhibit AC-like behavior that may cause the capacitor 270 and the capacitor 272 to pick up noise associated with the ELVDD 204 and capacitively couple through the source terminal 268, causing excess charge to be stored in the capacitor 272. The excess charge may negatively impact the operation of the pixel circuit 250.

Figure 12:
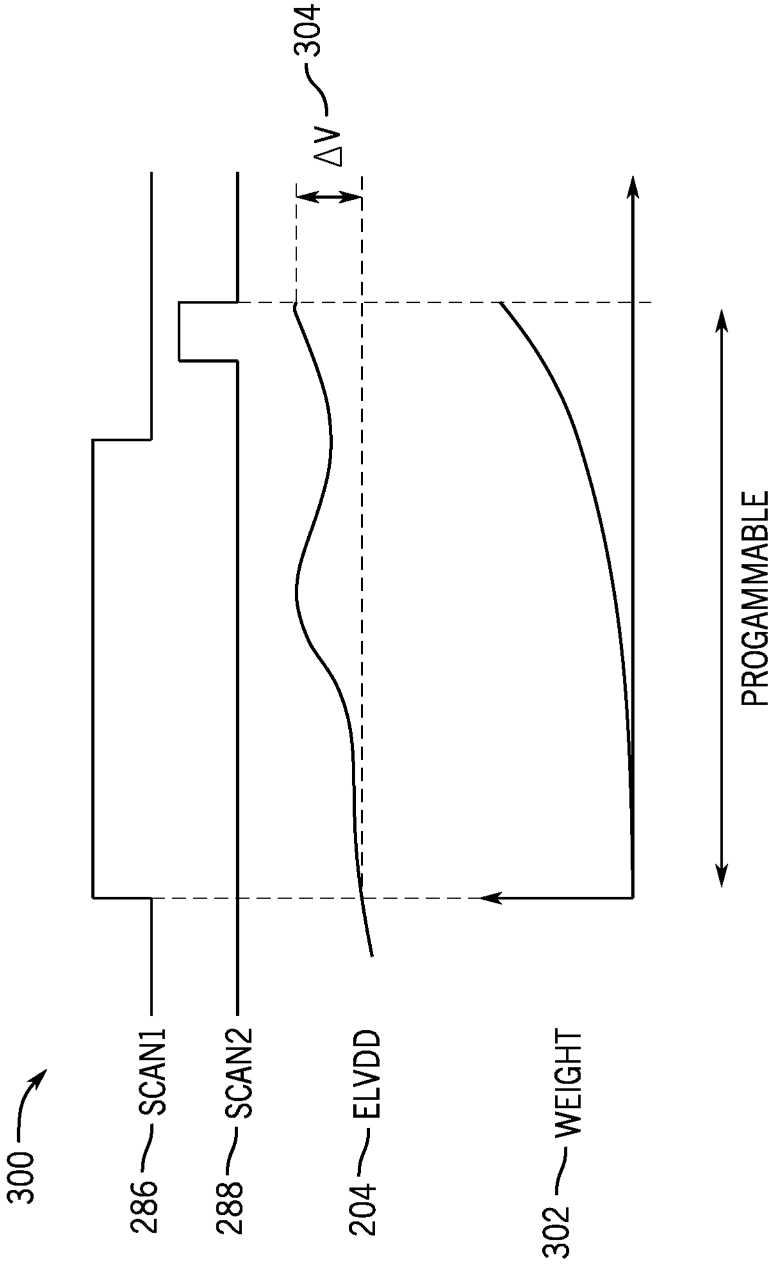
FIG. 12 is a graph illustrating the supply voltage error that occurs with respect to the pixel circuit of FIG. 11, in accordance with an embodiment.

FIG. 12 is a graph 300 illustrating the ELVDD error that occurs with respect to the pixel circuit 250 of FIG. 11. The graph 300 illustrates the behavior of the first scan line 286, the second scan line 288, and the ELVDD 204, and a compensation weight 302 that may be applied based on the ELVDD error 304. As may be observed, the ELVDD error 304 may accumulate with time, and the compensation weight 302 may increase accordingly to compensate for the accumulated ELVDD error 304. To compensate for the ELVDD error 304, accumulator circuitry may be implemented into a 2D digital compensation scheme to duplicate the accumulated ELVDD error 304 and enable the 2D digital compensation to compensate for the accumulated ELVDD error 304.

Figure 13:
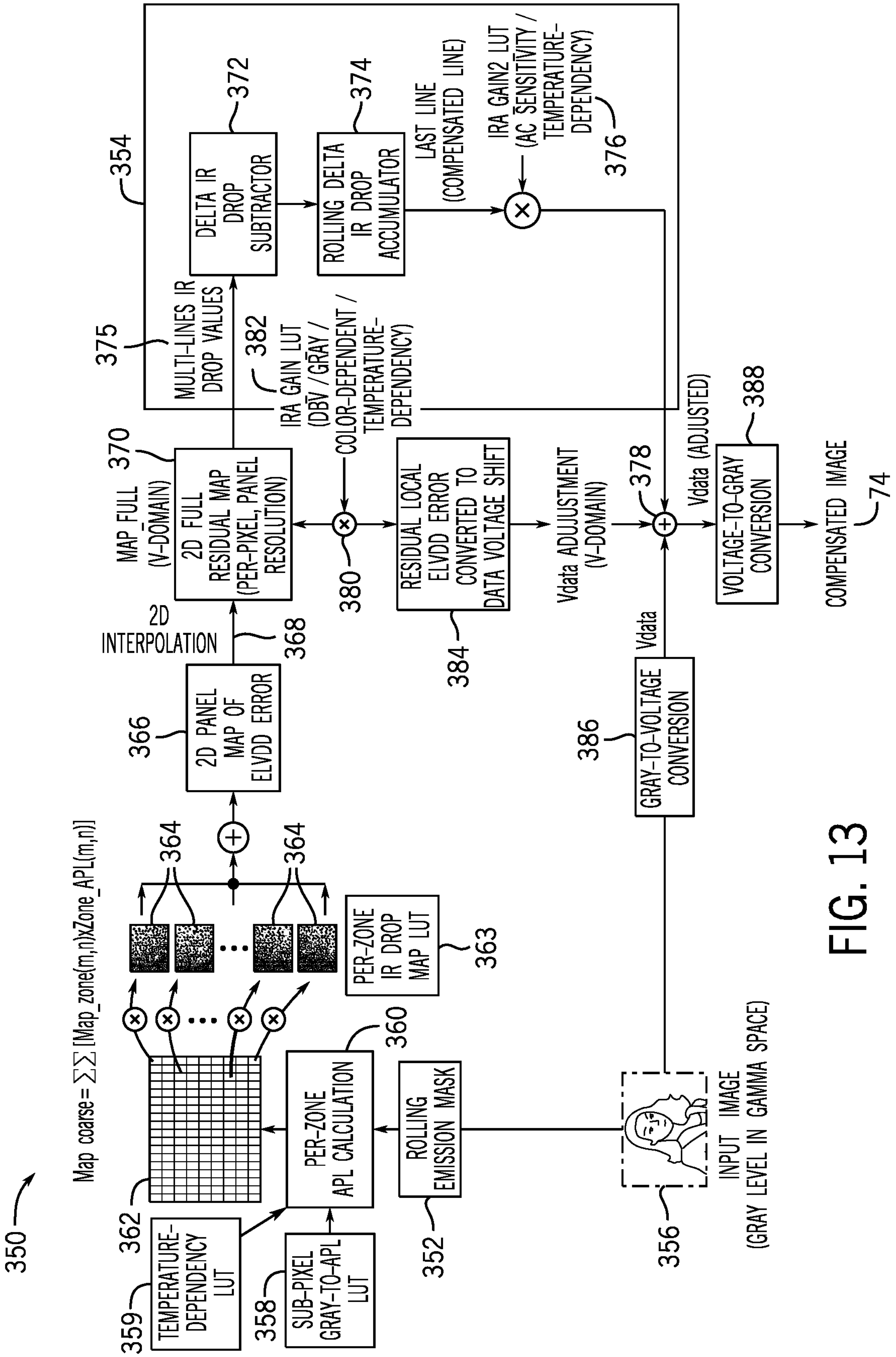
FIG. 13 is a block diagram of a 2D digital compensation that may eliminate or reduce the voltage fluctuations caused by DC and AC mechanisms, in accordance with an embodiment.

FIG. 13 is a block diagram of a 2D digital compensation 350 that may eliminate or reduce the voltage fluctuations caused by DC and AC mechanisms, in accordance with embodiments of the present disclosure. The 2D digital compensation 350 may include a rolling emission mask 352 that may enable the 2D digital compensation 350 to address DC error associated with the ELVDD 204 fluctuations and voltage error accumulator compensation 354 that may enable the 2D digital compensation 350 to address AC error associated with the ELVDD 204 fluctuations. The 2D digital compensation 350 may be carried out by compensation circuitry that may be coupled to the electronic display 12 (e.g., a display panel of the electronic display 12). Circuitry carrying out the 2D digital compensation 350 may receive as input an input image 356. The rolling emission mask 352 may be applied to the input image 356. The rolling emission mask 352 may mirror pulse-width modulation behavior for the electronic display 12. The 2D digital compensation 350 may take as inputs the input image 356, the rolling emission mask 352, one or more average pixel luminance (APL) values from a subpixel gray-to-APL LUT 358, and one or more temperature-dependency values from a temperature-dependency LUT 359, and output a per-zone APL calculation 360. Recalling that the display pixels 54 that are not emitting due to the emission mask 210 do not contribute to voltage error (e.g., IR drop), it may be appreciated that, by accounting for the rolling emission mask 352 prior to calculating per-zone APL calculations 360, the 2D digital compensation 350 may determine the voltage error across the electronic display 12 more accurately. With respect to the temperature-dependency LUT 359, IR drop may be influenced by temperature of the electronic display 12 under certain conditions (e.g., high DBV conditions). Consequently, to accurately map the IR drop, the per-zone APL calculation 360 may account for temperature-dependency values of the temperature-dependency LUT 359 to model the relationship between brightness on the panel, temperature, and corresponding IR drop.

Figure 14:
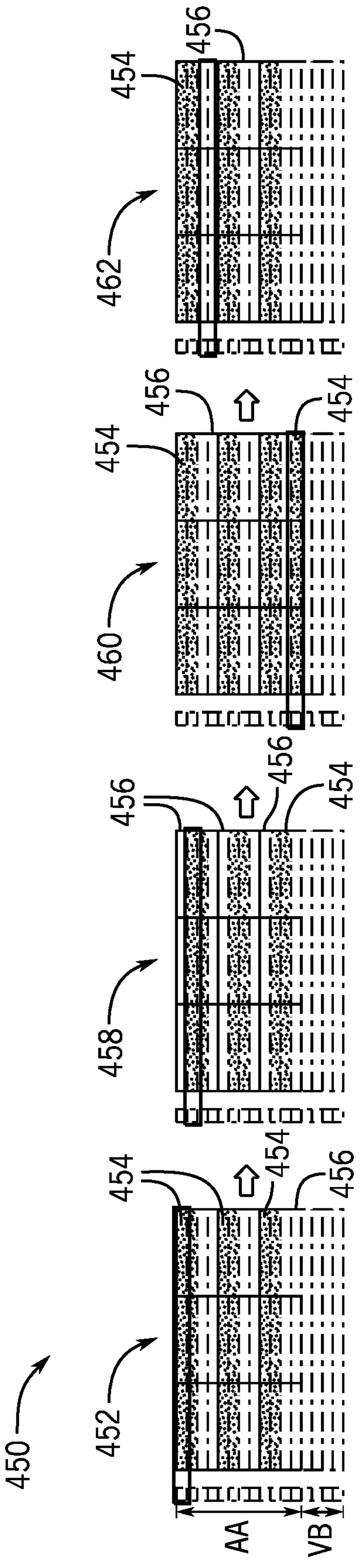
FIG. 14 is an illustration of the rolling emission mask tracking for the electronic display, in accordance with an embodiment.

FIG. 14 is an illustration of the rolling emission mask 352 tracking for the electronic display 12, in accordance with embodiments of the present disclosure. Image frame 452 includes EM blanks 454 (e.g., non-emitting rows) and emitting rows 456. In image frame 458, the emission profile shifts, and the position of the EM blanks 454 and the emitting rows 456 change accordingly. Image frames 460 and 462 both include new emissions masks, which may be reflected by the rolling emission mask 352.

Returning to FIG. 13, the 2D digital compensation 350 may superimpose a zone map (e.g., 362) over the electronic display 12. The zone map 362 may include any appropriate number of zones arranged in rows and columns (e.g., 10×10, 10×20, 20×40, and so on). In some embodiments, the size of the zone map 362 may be predetermined (e.g., during manufacture-stage calibration). The zone map 362 may include a corresponding lookup table 363, each entry of the lookup table 363 may include information regarding the anticipated voltage error (e.g., ELVDD error 304) relationship that may relate a modeled or empirically determined voltage error corresponding to APL and global brightness, which together may define the amount of current for each zone of the zone map 362. The voltage error information may be determined during manufacture-stage calibration, stored in the lookup table 363, and may be used to determine the size of the zone map 362.

The 2D digital compensation 350 may determine an anticipated voltage error map for each zone in the zone map 362 using the per-zone voltage error information stored in the lookup table. The 2D digital compensation 350 may generate, based on the per-zone APL calculation 360 and the anticipated per-zone voltage drop relationship information stored in the lookup table 363 of the zone map 362, a series of anticipated per-zone 2D voltage error maps 364 corresponding to each zone in the zone map 362. By applying the per-zone APL calculation 360 (which may provide a per-zone current magnitude based on the rolling emission mask 352 to the zone map 362) to the anticipated per-zone voltage drop relationship information (which may provide a per-zone resistance magnitude to the zone map 362), the per-zone 2D voltage error maps 364 may provide an accurate estimation of the actual voltage error (e.g., ELVDD error 304) across each zone of the zone map 362. The 2D digital compensation 350 may sum together the per-zone 2D voltage error maps 364 to generate a full 2D voltage error map 366. The full 2D voltage error map 366 may provide fine-grain voltage error information across the electronic display 12.

The 2D digital compensation 350 may interpolate the full 2D voltage error map 366 via a 2D interpolation 368. Interpolating via the 2D interpolation 368 may generate a full 2D residual voltage error map 370. The 2D digital compensation 350 may interpolate the full 2D voltage error map 366 to account for an analog compensation that will be (or already has been) performed by a display panel of the electronic display 12. The remaining voltage error after the analog compensation may be reflected in the full 2D residual voltage error map 370. Without accounting for the analog compensation, the 2D digital compensation 350 may compensate for the same voltage error for which the analog compensation will compensate, and thus lead to overcompensation and reduced image quality on the electronic display 12. Accounting for the baseline compensation handled by the analog compensation may reduce the compensation load on the 2D digital compensation 350 as well as prevent overcompensation. The analog compensation may be applied linearly across the electronic display 12 (e.g., the analog compensation may be a global analog compensation) or may be applied locally.

To address voltage error (e.g., ELVDD error 304) due to various AC mechanisms, the voltage error accumulator compensation 354 may be implemented in the 2D digital compensation 350. The voltage error accumulator compensation 354 may duplicate the AC error of the ELVDD 204 discussed with respect to FIGS. 11 and 12. The voltage error accumulator compensation 354 may include delta IR drop subtraction circuitry 372. The delta IR drop subtraction circuitry 372 may receive as an input multiple lines of voltage error (e.g., IR drop) values (referred to herein as multiline IR drop values 375) from the full 2D residual voltage error map 370. To accurately determine the voltage error, the multiline IR drop values 375 may include values for a large number of lines (e.g., 20 lines or more, 40 lines or more, 100 lines or more, and so on). The delta IR drop subtraction circuitry 372 feeds into a rolling delta IR drop accumulator 374. The delta IR drop subtraction circuitry 372 and the rolling delta IR drop accumulator 374 may duplicate the AC error experienced by the pixel circuit 250 of FIG. 11 to enable the 2D digital compensation 350 to compensate for the AC error. The product of an output of the rolling delta IR drop accumulator and one or more values of an IRA gain LUT 376 may be output to adding circuitry 378. The values of the IRA gain LUT 376 may be based on AC sensitivity and temperature dependency of a display pixel 54 or group of display pixels 54.

The full 2D residual voltage error map 370 may be multiplied at multiplication circuitry 380 with a value received from an IR adjustment gain LUT 382. The IR adjustment gain LUT 382 may be dependent on DBV, gray level, color component, and/or temperature-dependency of the display pixels 54 and/or the electronic display 12. Based on the input of the full 2D residual voltage error map 370 and the value from the IR adjustment gain LUT 382, the multiplication circuitry 380 outputs a voltage-to-gray conversion 384 based on a residual local error voltage (e.g., ELVDD error or ELVSS error). The voltage-to-gray conversion 384 may represent at least a portion of a compensation to the image data that constitutes the compensated image data 74. The voltage-to-gray conversion 384 may be summed with a gray-to-voltage conversion 386 and the product of the rolling delta IR drop accumulator 374 and the IRA gain LUT 376 at the adding circuitry 378, to produce to voltage-to-gray conversion 388. The voltage-to-gray conversion 388 may provide the 2D digital compensation to the input image 356 to generate the compensated image data 74.

Figure 15:
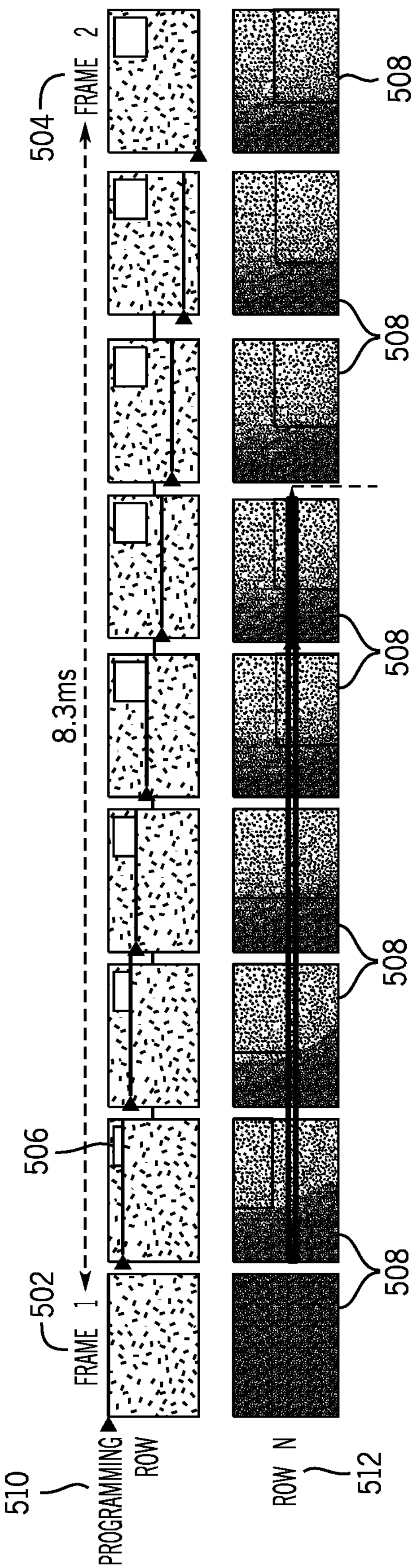
FIG. 15 is an illustration of voltage error mapping for a first and second frame of content, in accordance with an embodiment.

FIG. 15 is an illustration of voltage error mapping for a first and second frame of content, in accordance with embodiments of the present disclosure. FIG. 15 illustrates a transition from an image frame 502 to an image frame 504. A stress image 506 may be displayed on the image frame 502 and the image frame 504, and voltage error maps 508 may illustrate the voltage error across the electronic display 12 based on the stress image 506 displayed. A programming row 510 is illustrated across the image frame 502 and the image frame 504. Row N 512 may be a row presently being programmed with image data. In order to program row N 512, voltage error may be calculated, weighted, and accumulated (e.g., via the voltage error accumulator compensation 354) for row N 512 while row 1 to row N−1 is updated. In order to program row N+1, voltage error of row N+1 may be calculated, weighted and accumulated (e.g., via the voltage error accumulator compensation 354) while row 2 to row N is being updated. This process may repeat iteratively for each subsequent row (e.g., N+2, N+3) until all rows are programmed.

Figure 16:
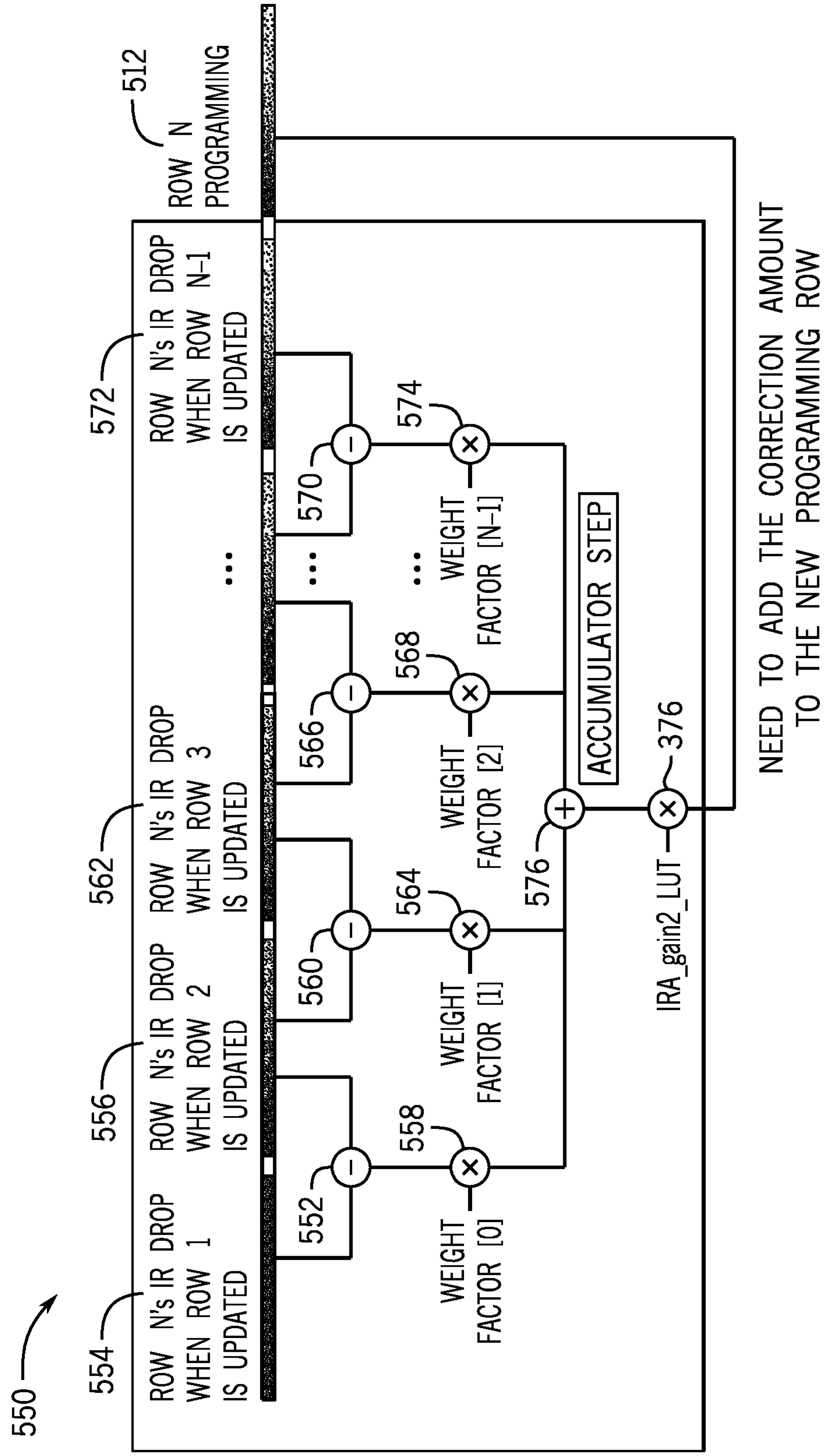
FIG. 16 is a diagram illustrating operation of the voltage error accumulator compensation, in accordance with an embodiment.

FIG. 16. is a diagram 550 illustrating operation of the voltage error accumulator compensation 354, in accordance with embodiments of the present disclosure. Subtracting circuitry 552 may determine a difference of IR drop 554 and IR drop 556, wherein IR drop 554 includes voltage error of Row N 512 when a row 1 is being updated, and wherein IR drop 556 includes voltage error of Row N 512 when a row 2 is updated. A weight factor 558 may be applied to the difference output by the subtracting circuitry 552. Similarly, subtracting circuitry 560 may determine a difference of IR drop 556 and IR drop 562, wherein IR drop 562 includes voltage error of Row N 512 when a row 3 is being updated. A weight factor 564 may be applied to the difference output by the subtracting circuitry 560. This may repeat with subtracting circuitries 566 and 570 and weight factors 568 and 574 until an IR drop 572 is determined while a row N−1 is updated.

The weighted differences may be combined at accumulation circuitry 576. The accumulation circuitry 576 may implement the voltage error accumulator compensation 354 as discussed above. The accumulated and weighted differences may then be outputted to be multiplied by the IRA gain LUT 376. By multiplying the accumulated weighted differences by the IRA gain LUT 376, the voltage error accumulator compensation 354 may duplicate the AC error experienced by the electronic display 12. The compensated data may be provided to the row N 512 to provide voltage error compensation. In this manner, the diagram 550 illustrates the operation of voltage error accumulator compensation 354.

Figure 17:
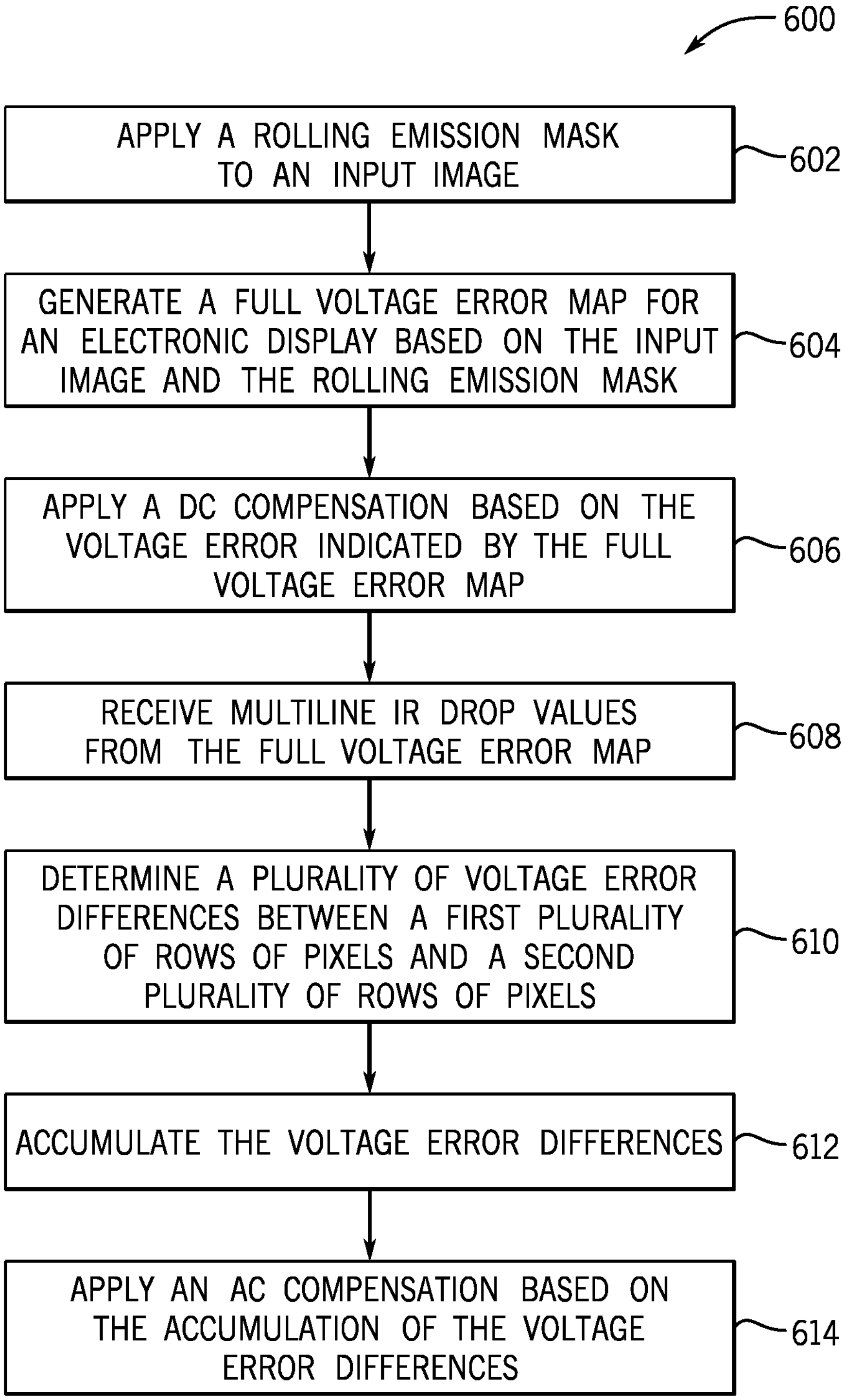
FIG. 17 is a flowchart of a method for compensating image data to account for a DC component of voltage error and an AC component of voltage error, in accordance with an embodiment.

FIG. 17 is a flowchart of a method 600 for compensating image data to account for a DC component of voltage error and an AC component of voltage error, in accordance with embodiments of the present disclosure. In process block 602, the 2D digital compensation 350 applies the rolling emission mask 352 to the input image 356. In process block 604 the 2D digital compensation 350 generates the full 2D residual voltage error map 370, as discussed above. In process block 606, the 2D digital compensation 350 applies a DC compensation based on the voltage error indicated by the full 2D residual voltage error map 370. In process block 608, the voltage error accumulator compensation 354 receives multiline IR drop values from the full 2D residual voltage error map 370. In process block 610, the voltage error accumulator compensation 354 determines a plurality of voltage error differences, such as the outputs of the subtracting circuitries 552, 560, 566, and 570 discussed with respect to FIG. 16. In process block 612, the voltage error accumulator compensation 354 accumulates the voltage error differences via the accumulation circuitry 576. In process block 614, the 2D digital compensation 350 applies an AC compensation based on the output of the accumulation circuitry 576.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ," it is intended that such elements are to be interpreted under 35 U.S.C. 112 (f). However, for any claims containing elements designated in any other manner, it is intended that such elements are not to be interpreted under 35 U.S.C. 112 (f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device, comprising:

an electronic display; and processing circuitry configured to:

apply a rolling emission mask to an input image displayed on the electronic display;

determine an alternating current (AC) voltage error compensation based on an anticipated content-dependent AC voltage error associated with displaying the rolling emission mask and the input image on the electronic display; and apply the AC voltage error compensation to mitigate the anticipated content-dependent AC voltage error.

2. The electronic device of claim 1, wherein the processing circuitry is configured to determine a direct current (DC) voltage error compensation based on an anticipated DC voltage error associated with displaying the input image on the electronic display and the rolling emission mask as applied to the input image.

3. The electronic device of claim 1, wherein the processing circuitry is configured to superimpose a zone map over the electronic display to identify a plurality of anticipated voltage error values associated with each zone of the zone map.

4. The electronic device of claim 3, wherein the processing circuitry is configured to determine a per-zone average pixel luminance based on the rolling emission mask as applied to the input image and a sub-pixel gray-to-average pixel luminance lookup table.

5. The electronic device of claim 3, wherein the processing circuitry is configured to determine a per-zone average pixel luminance based on the rolling emission mask as applied to the input image and a temperature-dependency lookup table.

6. The electronic device of claim 3, wherein the processing circuitry is configured to determine a lookup table corresponding to the zone map, wherein each entry of the lookup table comprises anticipated voltage error data for each zone of the zone map.

7. The electronic device of claim 6, wherein the processing circuitry is configured to generate a two-dimensional voltage error map based on a sum of the anticipated voltage error data for each zone of the zone map.

8. The electronic device of claim 7, wherein the processing circuitry is configured to generate a full two-dimensional residual voltage error map based on interpolating the two-dimensional voltage error map via a two-dimensional interpolation.

9. The electronic device of claim 8, wherein the processing circuitry is configured to receive at voltage error accumulation circuitry a plurality of multiline voltage error values from the full two-dimensional residual voltage error map and extract a plurality of voltage error differentials from the multiline voltage error values, wherein each voltage error differential comprises a voltage error differential between two lines of the multiline voltage error values.

10. The electronic device of claim 9, wherein the processing circuitry is configured to apply a plurality of compensation weights to each of the plurality of voltage error differentials to generate a plurality of weighted voltage error differentials.

11. The electronic device of claim 10, wherein the processing circuitry is configured to sum together the plurality of the weighted voltage error differentials, wherein summing together the plurality of the weighted voltage error differentials comprises duplicating AC voltage error associated with displaying the input image on the electronic display.

12. The electronic device of claim 11, wherein the processing circuitry is configured to multiply the plurality of weighted voltage error differentials by a plurality of values of a voltage adjustment gain lookup table, wherein the processing circuitry is configured to apply the AC voltage error compensation based on a product of the plurality of weighted voltage error differentials and the plurality of values of the voltage adjustment gain lookup table.

13. Tangible, non-transitory, computer-readable media comprising instructions that, when executed by one or more processors, cause the one or more processors to:

- determine a first voltage error differential between a display pixel row at a first time and the display pixel row at a second time;
- apply a first weighting factor to the first voltage error differential to generate a first weighted voltage error differential;
- determine a second voltage error differential between the display pixel row at the second time and the display pixel row at a third time;
- apply a second weighting factor to the second voltage error differential to generate a second weighted voltage error differential;
- combine the first weighted voltage error differential and the second weighted voltage error differential at accumulator circuitry to generate a duplicated voltage supply voltage error; and
- apply a compensation based on the duplicated voltage supply voltage error.

14. The tangible, non-transitory, computer-readable media of claim 13, wherein the second weighting factor is greater than the first weighting factor.

15. The tangible, non-transitory, computer-readable media of claim 13, wherein applying the compensation based on the duplicated voltage supply voltage error comprises causing the one or more processors to convert the duplicated voltage supply voltage error to grayscale value.

16. The tangible, non-transitory, computer-readable media of claim 13, wherein the display pixel row comprises a row of low-temperature polycrystalline oxide (LTPO) pixels.

17. An electronic display, comprising:

- a display panel comprising a plurality of pixels; and
- processing circuitry electrically coupled to the display panel, the processing circuitry configured to:
  - determine a direct current (DC) voltage error compensation based on a DC voltage error associated with an input image displayed on the display panel and a rolling emission mask;
  - determine an alternating current (AC) voltage error compensation based on an AC voltage error associated with displaying the input image on the display panel; and
  - apply the DC voltage error compensation and the AC voltage error compensation to mitigate the DC voltage error and the AC voltage error.

18. The electronic display of claim 17, wherein the processing circuitry is configured to superimpose a zone map over the electronic display to identify a plurality of anticipated voltage error values associated with each zone of the zone map and determine a per-zone average pixel luminance based on the rolling emission mask as applied to the input image, a sub-pixel gray-to-average pixel luminance lookup table, and a temperature-dependency lookup table.

19. The electronic display of claim 18, wherein the processing circuitry is configured to determine a size of the zone map based on the anticipated voltage error values, generate a two-dimensional voltage error map based on the size of the zone map and the plurality of anticipated voltage error values, and generate a full two-dimensional residual voltage error map based on interpolating the two-dimensional voltage error map via a two-dimensional interpolation.

20. The electronic display of claim 19, wherein the processing circuitry is configured to determine the AC voltage error based on performing a voltage error subtraction on multiline voltage error values received from the full two-dimensional residual voltage error map to generate voltage error differential values, and accumulating the voltage error differential values.

* * * * *